United States Patent [19]

Reale et al.

[11] 4,403,154

[45] Sep. 6, 1983

[54] APPARATUS TO GENERATE ELECTRICITY

[76] Inventors: Lucio V. Reale, 1371 Lake Ontario Dr., SE., Lake Bonavista, Calgary, Alberta; William R. McKay, 2700 Carlton St., SW., Calgary, Alberta, both of Canada

[21] Appl. No.: 331,734

[22] Filed: Dec. 17, 1981

[51] Int. Cl.³ .......................... F03B 13/12; F03D 9/00
[52] U.S. Cl. ....................................... 290/53; 290/54; 290/55; 91/4 R
[58] Field of Search ................................... 290/42–44, 290/53–55; 91/4 R

[56] References Cited

U.S. PATENT DOCUMENTS 3,100,965 8/1963 Blackburn .............................. 91/4 R
3,200,255 8/1965 Masuda ................................. 290/53

*Primary Examiner*—J. V. Truhe
*Assistant Examiner*—Shelley Wade
*Attorney, Agent, or Firm*—Townsend and Townsend

[57] ABSTRACT

An apparatus to generate electricity. There is a first cylinder having an open end and containing a first piston. A second cylinder has an open end and contains a second piston. A pipe communicates the two cylinders at the ends remote from their open ends. A closure can be moved to close and open the open end of each cylinder in sequence. The system receives a liquid between that part of the apparatus defined by the cylinders and the pipe and between the two pistons. An electrical generator is operated by movement of the liquid in the apparatus to generate electricity when fluid pressure acts on the first piston in the first cylinder, with the second cylinder closed by the closure, it moves the first piston inwardly, moving the liquid to the second piston through the pipe. Movement of the piston and thus of the liquid acts to operate the electrical generator. Movement of the closure closes the first cylinder and opens the second cylinder. This allows the fluid pressure to act on the second piston to move the first piston back to its start position. Electricity is also generated by movement of the second piston inwardly.

23 Claims, 9 Drawing Figures

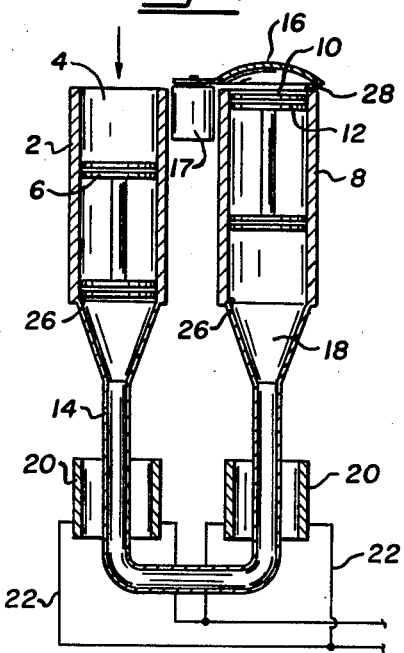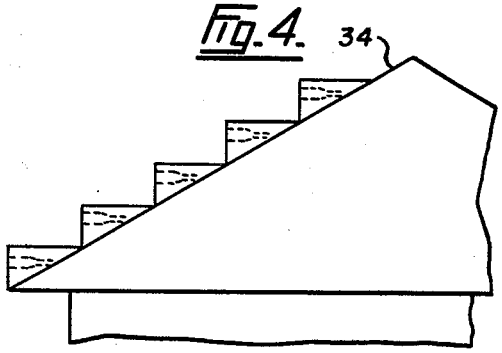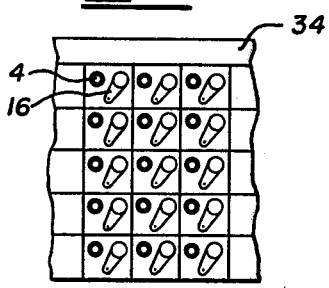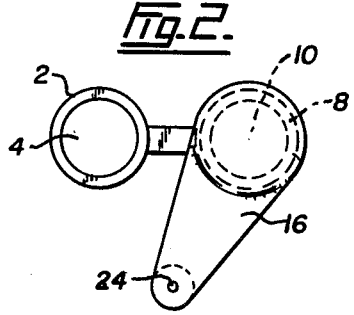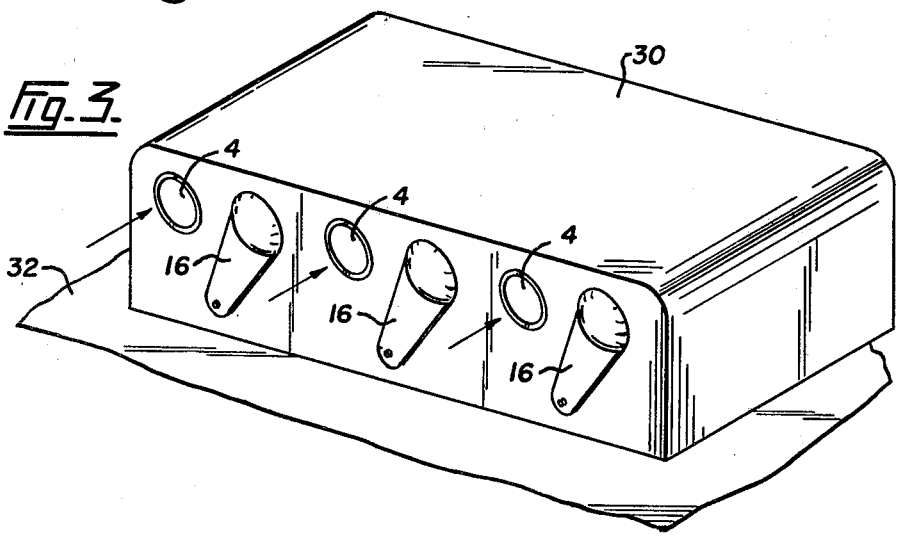

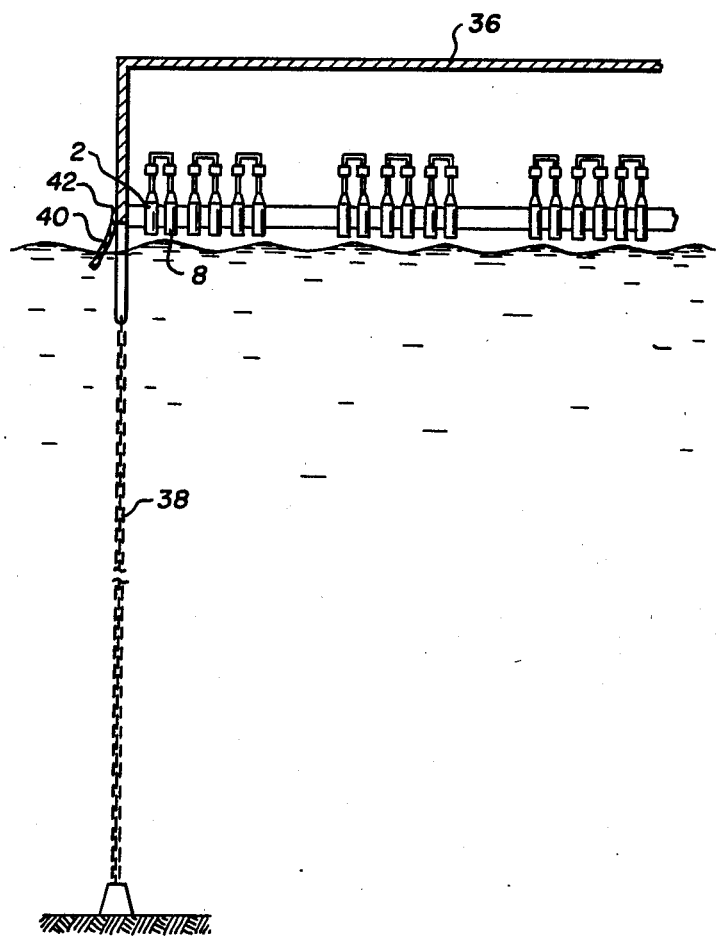

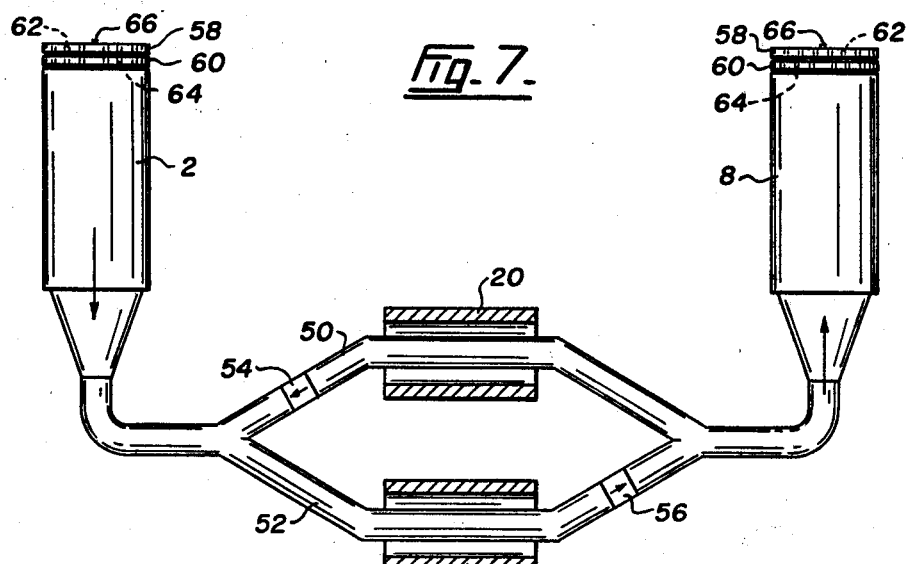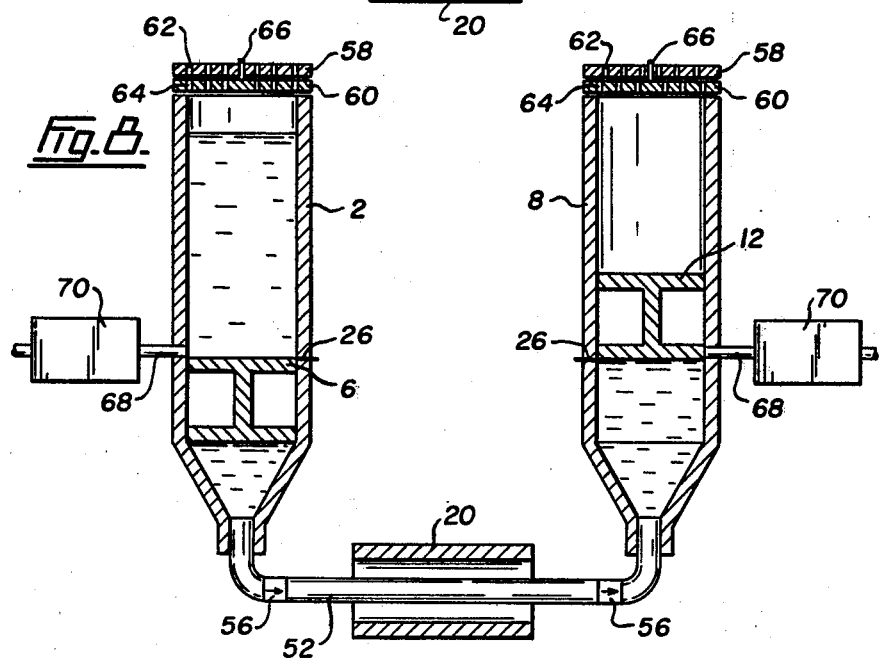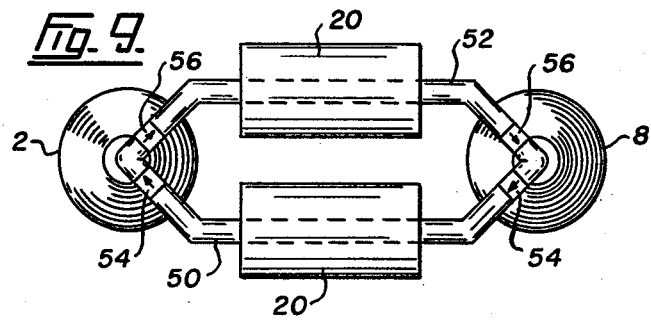

APPARATUS TO GENERATE ELECTRICITY

FIELD OF THE INVENTION

This invention relates to an apparatus to generate electricity.

DESCRIPTION OF THE PRIOR ART

Apparatus are known that generate electricity by wind power. For example windmills are now used to generate electricity by turning a rotor, the rotor driving electrical generating equipment. In addition to the prior art is replete with examples of devices to be mounted on motorcars so that the forward velocity of the vehicle, and the wind thus generated, can be used to turn vanes to rotate generators so that electricity may be generated. Such a system may be used either on an electric car, that is a car driven only by an electric motor, or by an electric driven vehicle provided with an auxiliary gasoline motor. Examples of such devices are shown in Fletcher's U.S. Pat. No. 4,093,035 which shows an air stream being used to operate tandem sets of vanes to generate electricity. U.S. Pat. No. 4,254,843 to Han shows a ventilator system to produce a whirling air flow that rotates a fan to drive an alternator. Again the air flow is generated by movement forward of the vehicle. Treat, in U.S. Pat. No. 4,141,425 shows an impeller driven alternator where the impeller is rotated by the action of the air passing over it. Treat also shows the use of a solar panel. Howe, in U.S. Pat. No. 4,179,007, shows a wind operated vehicle featuring a flywheel. The wind operates a rotor which is mounted on a flywheel and there is at least one generator powered by the rotating flywheel.

The above are mere examples of the use of generating equipment mounted on vehicles. An older patent, U.S. Pat. No. 1,634,167 to Wilson, is of interest for showing a wind operated device mounted on an airplane. Wilson goes so far as to suggest the possibility of an electrically driven aircraft.

SUMMARY OF THE INVENTION

The present invention however, seeks to produce a compact apparatus of simple construction in which the movement of a liquid can be used to generate electricity.

Accordingly, in a first aspect, the present invention is an apparatus to generate electricity comprising: a first cylinder having an open end; a first piston in the first cylinder; a second cylinder having an open end; a second piston in the second cylinder; a pipe communicating the two cylinders at the ends remote from their open ends; a closure member movable between a first position in which it closes off the open end of the first cylinder to a second position in which it closes off the open end of the second cylinder; the system being adapted to receive a liquid contained between that part of the apparatus defined by the cylinders and the pipe, between the two pistons, electrical generating means adapted to be operated by movement of the liquid in the apparatus to generate electricity; whereby fluid pressure acting on the first cylinder and thus the first piston, with the second cylinder closed by the closure member, moves the first piston inwardly, moving the liquid to the second piston through the pipe, movement of the piston and thus of the liquid acting to operate the electricity generating means, movement of the closure member allowing the fluid pressure to act on the second piston to move the first piston back to its start position, electricity being generated by movement of the second piston inwardly.

BRIEF DESCRIPTION OF THE DRAWINGS

Aspects of the invention are illustrated by way of example in the accompanying drawings in which:

FIG. 1 is a section through an embodiment of the present invention;

FIG. 2 is a detail of FIG. 1;

FIG. 3 illustrates a further aspect of the present invention;

FIG. 4 illustrates an application of the invention on a house;

FIG. 5 is a front view of the apparatus of FIG. 4;

FIG. 6 illustrates a floating embodiment of the invention;

FIG. 7 illustrates a further embodiment of the present invention;

FIG. 8 illustrates a desirable feature of an embodiment similar to FIG. 7; and

FIG. 9 illustrates a particular configuration of the electrical generating means.

DESCRIPTION OF THE PREFERRED EMBODIMENTS

Referring to the drawings FIG. 1 illustrates an apparatus to generate electricity comprising a first cylinder 2 having an open end 4. There is a first piston 6 in the first cylinder 2. A second cylinder 8 has an open end 10 and there is a second piston 12 in the second cylinder 8. A pipe 14 communicates the two cylinders 2 and 8 at the ends remote from the open ends of the cylinders. There is a closure member 16 movable by a motor 17 between a first position in which it closes off the open end of cylinder 8, as shown in FIG. 1, to a second position in which it closes off the open end of the cylinder 2. The system is adapted to receive a liquid 18 contained between that part of the apparatus defined by the cylinders 2 and 8 and the pipe 14, between the two pistons 6 and 12.

Electrical generating means 20 illustrated schematically, is adapted to be operated by movement of the liquid 18 in the apparatus and to generate electricity. The appropriate wiring 22 is provided so that the generated electricity may be collected.

FIG. 2 is an end view of FIG. 1 and shows that the closure member 16 can be pivoted about 24 so that it moves first to close off one cylinder then the other. Limit switches 26 are provided in the cylinders 2 and 8 and are arranged so that when contacted by the piston 6 or 12 the closure member 16 is moved.

The apparatus illustrated in FIGS. 1 and 2 functions as follows: The wind pressure acting on the first cylinder 2 moves the first piston 6 down the cylinder 2 with the closure member 16 acting to close off the second cylinder 8. Although the second cylinder 8 is closed off from the force of the wind there are spaces 28 so that the gas within the cylinder 8 may be moved out and the second piston 12 moves upwardly as the first piston 2 moves downwardly under wind pressure. As the first piston moves downwardly and the second piston upwardly in their respective cylinders the liquid 18 is moved past the electricity generating apparatus 20 causing, typically, rotation of the apparatus and thus the generation of electricity which is collected in the wiring 22 shown schematically in FIG. 1 and conveyed to a collector, for example a battery or used directly. When the first piston 6 moves down and contacts the limit switch 26 electric motor 17 is operated to move the closure member 16 to cover the first cylinder 2. The gas pressure or wind pressure then exerted by the wind acts on the second piston 12, moving it downwardly in the cylinder 8. The wind pressure cannot act on the first piston 6 because the closure member 16 is closing and it is free to move upwardly in the cylinder 2.

Of course it will be appreciated that the piston should be provided with sealing means as, for example, piston rings formed of low friction material, for example of silicone or of polytetrafluoroethylene.

FIG. 3 illustrates the invention of FIG. 1 mounted in a structure 30 on the roof 32 for an automobile. The electricity generated is fed into the automobile system. Typically the car will be electrically driven although an auxiliary motor, for example an internal combustion engine, may be used.

FIGS. 4 and 5 illustrate an aspect of the invention in use on the roof 34 of a house. The prevailing winds act on the pairs of pistons as shown in FIG. 5. The operation of the device is precisely as described for in FIG. 1.

FIG. 6 illustrates schematically an embodiment of the invention that floats in the sea. There is a structure 36 containing a plurality of pistons and cylinders and interconnecting pipes with electrical generating apparatus associated with the pipes as shown in FIG. 1. The details of the structure are omitted as they are the same as in FIG. 1. The housing 36 is anchored by a chain 38 to the bottom of the sea. A flexible flap 40, pivoted at 42 protects the apparatus from floating debris.

The arrangement is that as the waves move into the pistons 6 and 12 as in FIG. 1 within the cylinders 2 and 8 but by contacting them with water. Thus the apparatus functions precisely as the pair of cylinders as shown in FIG. 1. Again although not shown the limit switches 26 shown in FIG. 1 are present in the cylinders 2 and 8.

FIG. 7 illustrates a particularly desirable feature in that the electrical generating means 20 positioned between the two cylinders 2 and 8 are each positioned in branch pipes 50 and 52 with each branch pipe having an electrical generating means. The branch pipes 50 and 52 also have a check valve 54 and 56 and this arrangement is present so that any one electrical generating means 20 will only rotate in one direction. Thus the electrical generating means 20 in pipe 50 in FIG. 7 will only be operated by the downward movement of piston 12 in cylinder 8 and the electrical generating means 20 in pipe 52 will only be operated by the downward movement of the piston 6 in the cylinder 2. This, of course, is assured by the check valves 54 and 56. FIG. 7 also illustrates replacement of the closure members 16, reciprocating between cylinders 2 and 8, by the provision at the top of each cylinder of rotating plates 58 and 60. Each plate is formed with perforations 62 and 64. The perforations in both plates can be aligned to allow a fluid to pass through or, by relative movement of the plates about axle 66, can be misaligned to ensure that a fluid cannot pass through. The rotation of the plates 58 and 60 can be timed for each cylinder to achieve precisely the same effect as a reciprocating member 26.

FIG. 8 illustrates an important aspect of the invention in that it is designed to be operated by a liquid, for example to be mounted in a stream or beneath a water fall. The pistons 6 and 12 are moved by, for example, water pressure. When the pistons 6 and 12 are moved to their lowermost extent then, as a preferred feature, the liquid drains through outlets 68 communicating with a small electrical generator 70 so that the water leaving the system is used to generate electricity. As in the embodiment of FIG. 7 the apparatus is provided with check valves 54 and 56, that is it has two electrical generators 20 in branch pipes, and with the rotating plates 58 and 60. However, it will also be appreciated that the rotating plates can be replaced by closure members 16 as illustrated in FIG. 1. FIG. 9 is a bottom view of FIG. 8 illustrating the use of a plurality of check valves 54 and 56 and the use of twin electrical generating systems, one in each bypass.

The embodiment of FIG. 8, although operated by a liquid, operates precisely as the embodiment of FIG. 1 with, of course, the exception that the excess fluid, usually water, is used to generate electricity. As in the embodiment of FIG. 1 a limit switch 26 in each piston controls ingress of fluid into the cylinders, by rotating the plates to ensure that the pistons are depressed in sequence.

We claim:

1. An apparatus to generate electricity comprising:
   a first cylinder having an open end;
   a first piston in the first cylinder;
   a second cylinder having an open end;
   a second piston in the second cylinder;
   a pipe communicating the two cylinders at the ends remote from their open ends;
   closure means to close and open the open end of each cylinder in sequence;
   the system being adapted to receive a liquid contained between that part of the apparatus defined by the cylinders and the pipe, between the two pistons;
   electrical generating means adapted to be operated by movement of the liquid in the apparatus to generate electricity;
   whereby fluid pressure acting on the first piston in the first cylinder, with the second cylinder closed by the closure means, moves the first piston inwardly, moving the liquid to the second piston through the pipe;
   movement of the piston and thus of the liquid acting to operate electrical generating means,
   movement of the closure means to close the first cylinder and open the second cylinder, allowing the fluid pressure to act on the second piston to move the first piston back to its start position, electricity also being generated by movement of the second piston inwardly.

2. An apparatus as claimed in claim 1 in which the closure means comprises a closure member movable between a first position in which it closes off the open end of the first cylinder to a second position in which it closes off the open end of the second cylinder.

3. Apparatus as claimed in claim 1 in which the closure means comprises a pair of perforate plates positioned at the open end of each cylinder, the perforations in the plates being such that they can move from a position where they align with perforations in the other plate to allow access to the cylinder or misaligned with perforations in the other plate to prevent access to the cylinder.

4. Apparatus as claimed in claim 1 including a motor to move the closure means to close and open the cylinders in turn.

5. Apparatus as claimed in claim 4 including switch limit means in each cylinder so that as the piston is moved back in that cylinder it moves the limit switch to turn the motor to move the closure means to close the open cylinder and open the closed cylinder.

6. Apparatus as claimed in claim 1 including a plurality of pairs of first and second cylinders formed in one housing, each pair joined by a pipe.

7. Apparatus as claimed in claim 6 in which each pair of cylinders is joined by two pipes with electrical generating means formed in each pipe.

8. Apparatus as claimed in claim 7 in which each pipe is formed with a check valve whereby the liquid can only pass through a pipe in one direction, that direction being opposed to the direction of flow in the other pipe, to ensure that the electrical generating means rotates only in one direction.

9. Apparatus as claimed in claim 1 adapted to be operated by gas pressure acting on the open cylinders and thus on the pistons contained in those cylinders.

10. Apparatus as claimed in claim 1 adapted to be operated by water and including an outlet at the lowermost point of piston travel whereby liquid built up in a cylinder can be evacuated from that cylinder when the piston reaches its lowermost point of travel.

11. Apparatus as claimed in claim 10 in which the water leaving the outlet passes through an auxiliary generating means to generate additional electricity.

12. Apparatus as claimed in claim 2 in which the closure member reciprocates.

13. Apparatus as claimed in claim 2 in which the closure member rotates.

14. Apparatus as claimed in claim 1 mounted in a housing anchored in the sea with the first and second cylinders pointing downwardly, their open ends towards the sea;
   whereby, movement of the sea waves raises the piston in the open cylinder, the other cylinder being closed by the closure means.

15. Apparatus as claimed in claim 14, including a flexible flap placed at the housing perimeter at sea level.

16. Apparatus as claimed in claim 1 mounted on a housing.

17. Apparatus as claimed in claim 1 mounted on the roof of a house.

18. Apparatus as claimed in claim 9 in which the gas pressure is wind pressure.

19. Apparatus as claimed in claim 9 in which the gas pressure is from a geothermal source and supplemented by liquid pressure.

20. Apparatus as claimed in claim 18 in which the wind pressure is developed by the forward motion of a vehicle.

21. Apparatus as claimed in claim 14 in which movement of the sea waves is tidal movement.

22. Apparatus as claimed in claim 1 mounted on a roof top.

23. Apparatus as claimed in claim 14 in which the pipe communicating the two cylinders is substantially horizontal.

* * * * *